US012803229B2

(12) United States Patent
Chou et al.

(10) Patent No.: US 12,803,229 B2
(45) Date of Patent: Nov. 17, 2026

(54) POWER SUPPLY DEVICE

(71) Applicant: LITE-ON TECHNOLOGY CORPORATION, Taipei (TW)

(72) Inventors: Ching-Chan Chou, Taipei (TW); Shu-Hsien Huang, Taipei (TW); Hsin-Yu Hsu, Taipei (TW); Tien-Hsaing Tai, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 357 days.

(21) Appl. No.: 18/660,266

(22) Filed: May 10, 2024

(65) Prior Publication Data

US 2025/0300408 A1 Sep. 25, 2025

(30) Foreign Application Priority Data

Mar. 20, 2024 (CN) ......................... 202420546586.0

(51) Int. Cl.
*H01R 13/66* (2006.01)
*H01R 13/10* (2006.01)
*H01R 13/514* (2006.01)

(52) U.S. Cl.
CPC ......... *H01R 13/6675* (2013.01); *H01R 13/10* (2013.01); *H01R 13/514* (2013.01)

(58) Field of Classification Search
CPC ..... H01R 13/6675; H01R 13/44; H01R 31/06
USPC .......................................... 439/170–175, 518
See application file for complete search history.

(56) References Cited

U.S. PATENT DOCUMENTS

| | | | | | |
|---|---|---|---|---|---|
| 6,126,460 | A * | 10/2000 | Wu | H01R 35/04 | 439/640 |
| 7,547,219 | B2 * | 6/2009 | Zhuge | H01R 31/065 | 439/173 |
| 7,654,838 | B1 * | 2/2010 | Zhuge | H01R 27/00 | 439/173 |
| 7,946,884 | B2 * | 5/2011 | Chiang | H01R 27/00 | 439/518 |
| 8,936,490 | B2 * | 1/2015 | Hsu | H01R 24/30 | 439/103 |
| 8,944,845 | B2 * | 2/2015 | Yu | H01R 13/447 | 439/518 |
| 2011/0039435 | A1 * | 2/2011 | Huang | H01R 31/06 | 439/651 |
| 2011/0223787 | A1 * | 9/2011 | Chen | H01R 31/06 | 439/131 |
| 2013/0300366 | A1 * | 11/2013 | Liu | H01R 31/065 | 320/111 |
| 2025/0038463 | A1 * | 1/2025 | Tsai | H01R 27/00 | |

* cited by examiner

*Primary Examiner* — Christopher M Koehler
*Assistant Examiner* — Gregory L Mangot
(74) *Attorney, Agent, or Firm* — WPAT, PC

(57) ABSTRACT

A power supply device is provided. The power supply device includes a body and a plug. The body has a binding region, wherein the body includes a plurality of conductive members assembled to the binding region separately from each other, wherein each of the conductive members includes a protruding part having a through hole. The plug is replaceably combined with the binding region. The plug includes a plurality of pins and a plurality of ribs, and the pins are electrically coupled to the protruding parts of the conductive members respectively, and a portion of the pins extend in the through holes.

18 Claims, 7 Drawing Sheets

POWER SUPPLY DEVICE

This application claims the benefit of People's Republic of China patent application Serial No. 202420546586.0, filed Mar. 20, 2024, the subject matter of which is incorporated herein by reference.

BACKGROUND OF THE INVENTION

The invention relates in general to a power supply device, and more particularly to a power supply device with a replaceable plug.

DESCRIPTION OF THE RELATED ART

The existing power supply device generally includes a plug and a body, and the plug is assembled to the body. The current from the external power supply can flow to the body through the plug, and then flow through the body to the electrical product or battery connected to the body. However, after the existing plug is assembled to the body, it is difficult to change the relative position between the plug and the body, and the plug cannot be replaced.

SUMMARY OF THE INVENTION

According to an embodiment of the present invention, a power supply device is provided. The power supply device comprises a body and a plug. The body has a binding region, wherein the body comprises a plurality of conductive members assembled to the binding region separately from each other, wherein each of the conductive members comprises a protruding part having a through hole. The plug is replaceably combined with the binding region. The plug comprises a plurality of pins and a plurality of ribs, and the pins are electrically coupled to the protruding parts of the conductive members respectively, and a portion of the pins extend in the through holes.

According to another embodiment of the present invention, a power supply device is provided. The power supply device comprises a body and a plug. The body has a binding region, wherein the body comprises a plurality of conductive members assembled to the binding region separately from each other, wherein each of the conductive members comprises a protruding part having a through hole. The plug is replaceably combined with the binding region. The plug comprises an upper housing, a plurality of pins and a plurality of ribs; the pins and the ribs are combined with the upper housing; the pins are electrically coupled to the protruding parts of the conductive members respectively; a portion of the pins are engaged with the through holes; the pins extend between two adjacent ribs of the ribs or extend between a rib of the ribs and the upper housing The above and other aspects of the invention will become better understood with regard to the following detailed description of the preferred but non-limiting embodiment(s). The following description is made with reference to the accompanying drawings.

DETAILED DESCRIPTION OF THE INVENTION

Each embodiment of the present invention will be described in detail below, with drawings as examples. In addition to these detailed descriptions, the present invention can also be widely implemented in other embodiments. Easy substitutions, modifications, and equivalent changes of any described embodiments are included in the scope of the present invention, and the scope of the present invention is determined by the claims of the present invention. In the description of the specification, many specific details and implementation examples are provided to enable readers to have a more complete understanding of the present invention; however, these specific details and implementation examples should not be regarded as limitations of the present invention. In addition, well-known steps or elements are not described in detail to avoid unnecessary limitations of the present invention.

Figure 1:
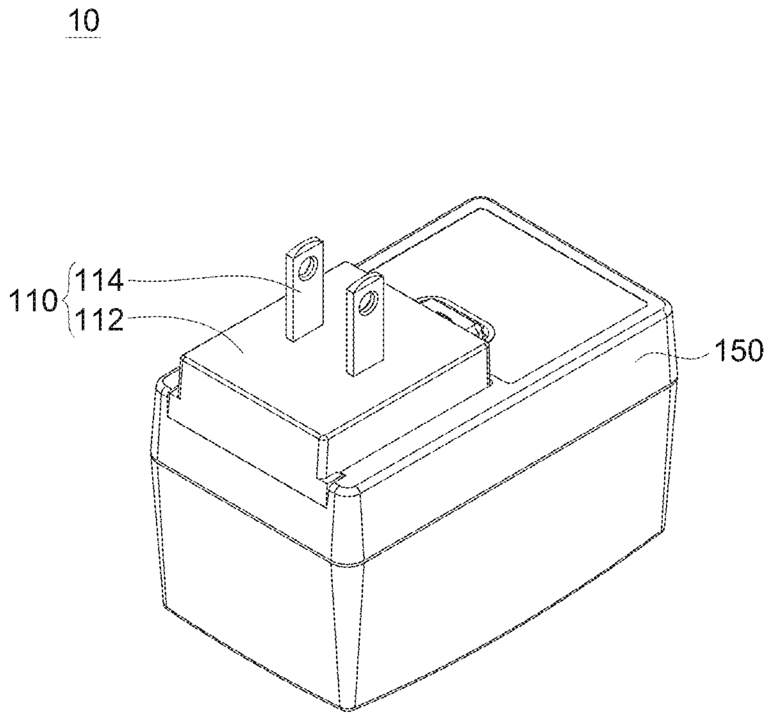
FIG. 1 is a perspective view of a power supply device according to an embodiment of the present invention.
Figure 2A:
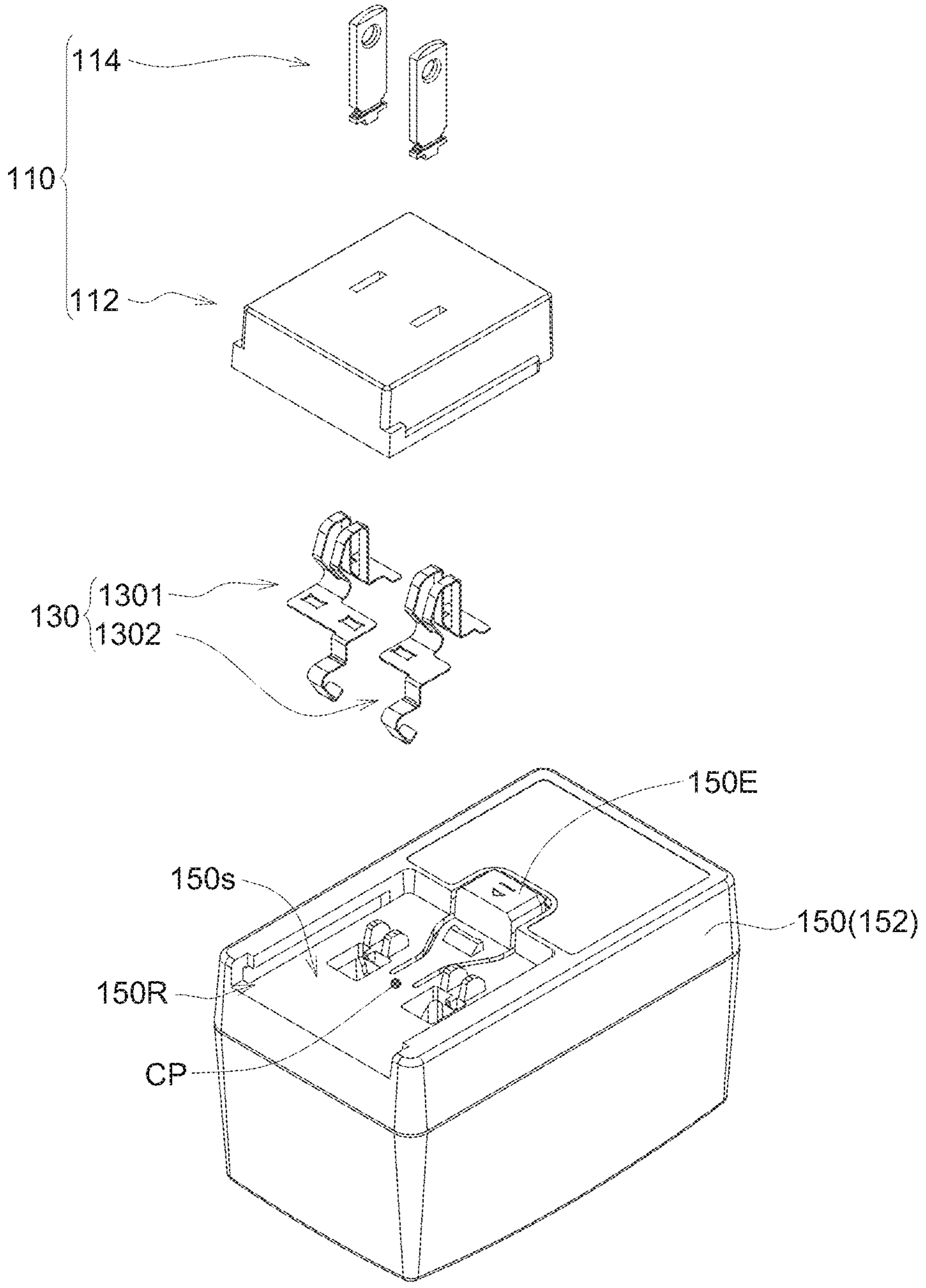
FIG. 2A shows an exploded view of the power supply device of FIG. 1.
Figure 2B:
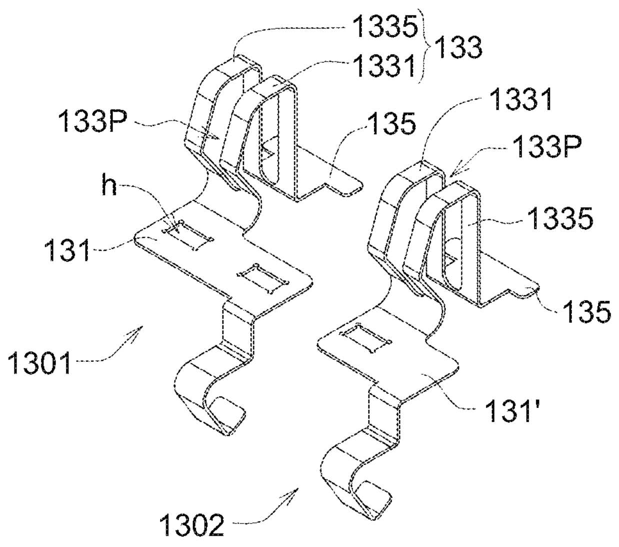
FIG. 2B is an enlarged view of conductive members of a body of the power supply device of FIG. 1.
Figure 2C:
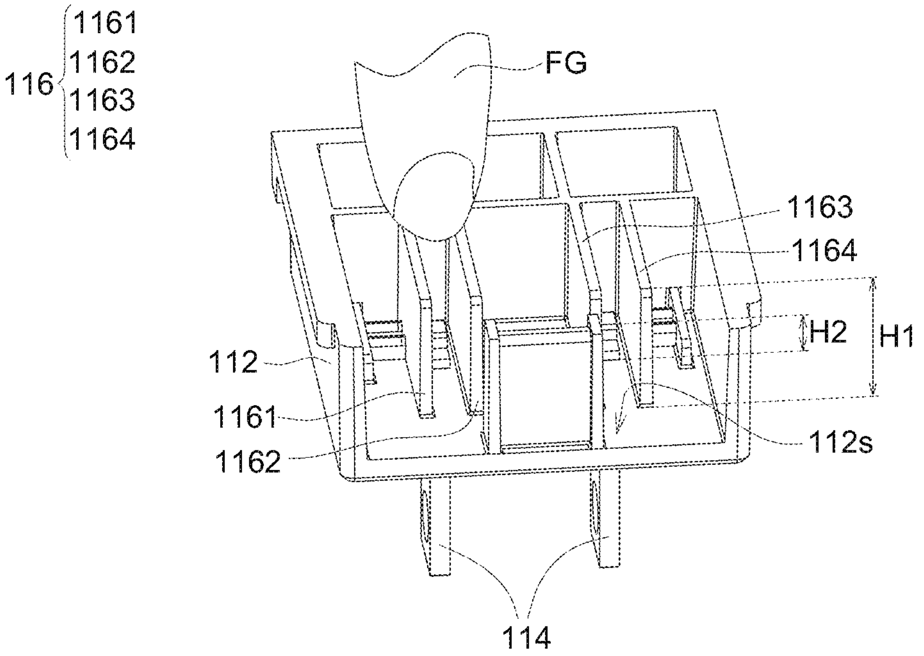
FIG. 2C is a three-dimensional view of a plug of the power supply device of FIG. 1.
Figure 3A:
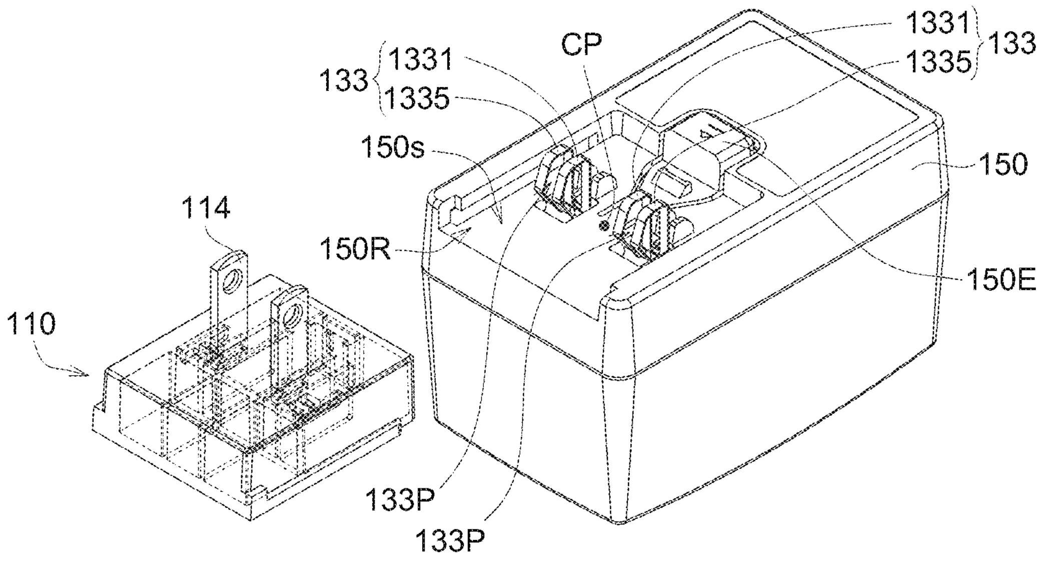
FIG. 3A is a schematic diagram of the power supply device of FIG. 1 before the plug is assembled to the body.
Figure 3B:
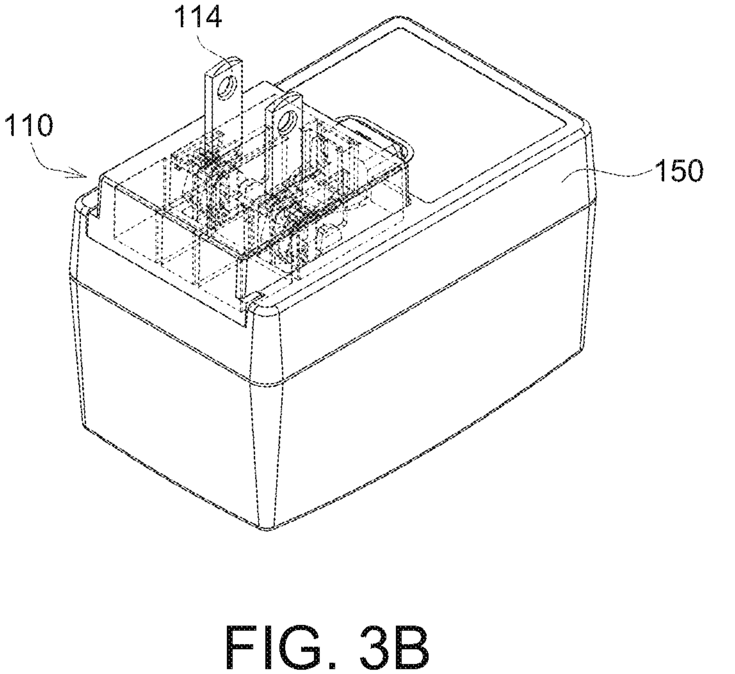
FIG. 3B is a schematic diagram of the power supply device of FIG. 1 after the plug is assembled to the body.
Figure 4A:
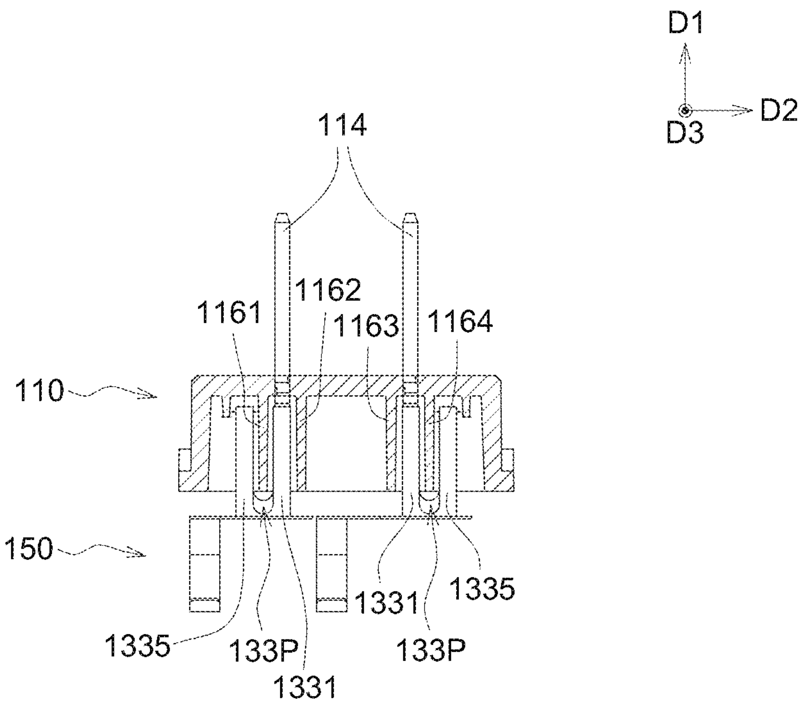
FIG. 4A illustrates a partial cross-sectional view of the power supply device of FIG. 1.
Figure 4B:
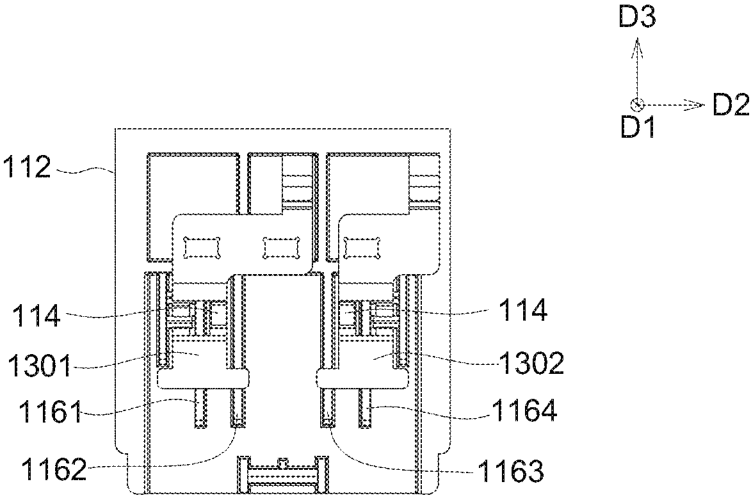
FIG. 4B shows a partial bottom view of the power supply device of FIG. 1.

FIG. 1 is a perspective view of a power supply device 10 according to an embodiment of the present invention. FIG. 2A shows an exploded view of the power supply device 10 of FIG. 1. FIG. 2B is an enlarged view of conductive members 130 of a body 150 of the power supply device 10 of FIG. 1. FIG. 2C is a three-dimensional view of a plug 110 of the power supply device 10 of FIG. 1. FIG. 3A is a schematic diagram of the power supply device of FIG. 1 before the plug 110 is assembled to the body 150. FIG. 3B is a schematic diagram of the power supply device 10 of FIG. 1 after the plug 110 is assembled to the body 150. FIG. 4A illustrates a partial cross-sectional view of the power supply device 10 of FIG. 1. FIG. 4B shows a partial bottom view of the power supply device 10 of FIG. 1, for example, viewing from the bottom of FIG. 4A to the top.

Please refer to FIGS. 1 to 2A at the same time. The power supply device 10 includes a body 150 and a plug 110. The plug 110 is a replaceable plug and is assembled to the body 150. In detail, the body 150 has a binding region 150R, and the plug 110 is replaceably combined with the binding region 150R. The body 150 includes a lower housing 152 and a plurality of conductive members 130 (e.g., 1301 and 1302). In the present embodiment, the number of conductive members 130 is two, including 1301 and 1302, but the invention is not limited thereto. The binding region 150R is formed on the top (for example, an edge adjacent to the top) of a lower housing 152, and the conductive members 130 (e.g., 1301 and 1302) are assembled to the binding region 150R separately from each other. In some embodiments, the conductive members 130 may be a conductive elastic piece, and each of the conductive members 130 may be an integral structure, that is, an one-piece conductive elastic piece.

As shown in FIGS. 2A and 2B, each of the conductive members 130 (for example, 1301 and 1302) includes a first extension part 131 or 131', a protrusion part 133 and a second extension part 135, and the protrusion part 133 has a through hole 133P. The protruding part 133 is connected between the first extension part 131 or 131' and the second extension part 135, and the protruding part 133 forms a first part 1331 and a second part 1335 corresponding to an inner side and an outer side respectively by the through hole 133P. The inner side is closer to a center point CP of the binding region 150R in comparison with the outer side. In the present embodiment, the difference between the conductive members 1301 and 1302 is that the first extension parts 131 and 131' are different. For example, the first extension part 131 includes two fixing holes h, and the first extension part 131' includes one fixing hole h, however, the present invention is not limited thereto. In other embodiments, the first extending parts 131 and 131' are also the same as each other.

As shown in FIGS. 2C and 3B, the plug 110 is replaceably combined with the binding region 150R, where the plug 110 includes an upper housing 112, a plurality of pins 114 and a plurality of ribs 116. In the present embodiment, the number of pins 114 is, for example, 2, and the number of ribs 116 is, for example, at least 4, but the present invention is not limited thereto. The pins 114 and the ribs 116 are combined with the upper housing 112. The pins 114 are electrically coupled to the protruding pats 133 of the conductive members 130, respectively. The ribs 116 are disposed on an inner surface 112*s* of the upper housing 112 (i.e., the surface adjacent to the binding region 150R). In some embodiments, the ribs 116 and the upper housing 112 may be an integral structure. The pins 114 pass through the upper housing 112 from the outside and extend to the inside of the upper housing 112 (for example, extending beyond the inner surface 112*s* of the upper housing 112) to electrically couple with the corresponding protruding part 133. The ribs 116 are connected to the upper housing 112 and protruding toward the inside of the upper housing 112 (i.e., protruding from the inner surface 112*s* of the upper housing 112), wherein a height H1 of each of the ribs 116 inside the upper housing 112 protruding from the upper housing 112 is greater than a height H2 of each of the pins 114 inside the upper housing 112 protruding from the upper housing 112 (H1>H2), as shown in FIG. 2C. In the present invention, the height and spacing of the ribs 116 are specially designed to prevent the user's fingers FG from contacting the pins 114.

In the present embodiment, the power supply device 10 is applied in the United States, and the pins 114 comply with National Electrical Manufacturers Association standard. The pins 114 are in electrical contact with the first parts 1331 of the protruding parts 133. However, the present invention is not limited thereto. In fact, the pins 114 can be in electrical contact with the first parts 1331 or the second parts 1335 of the protruding parts 133 according to the regulations of different countries. Therefore, no matter which country the spacing of the pins 114 is applicable to, the conductive members 130 of the present invention can be applied.

In the present embodiment, the binding region 150R may include a recess, and the lower housing 152 has a bottom surface 150*s* at the bottom of the recess in the binding region 150R, as shown in FIG. 3A. The protruding parts 133 of the conductive members 130 (for example, 1301 and 1302) protrude from the bottom surface 150*s* of the recess, and the first extension parts 131 and 131' and the second extension parts 135 are disposed under the bottom surface 150*s* of the recess.

Please refer to FIGS. 3A to 4B at the same time. The plug 110 is detachably combined with the binding region 150R in a sliding manner. For example, the opposite side walls of the recess forming the binding region 150R may have slide groove structures to engage with the corresponding engaging structures of the plug 110 so that the plug 110 can slide into the binding region 150R. In some embodiments, the body 150 further includes a pressing part 150E adjacent to the binding region 150R. The user can detach the plug 110 from the body 150 by pressing the pressing part 150E. As shown in FIG. 4A, after the plug 110 is assembled to the body 150, a portion of the ribs 116 extend into the through holes 133P. For example, the ribs 1161 and 1164 respectively extend in different through holes 133P. In other words, a portion of the ribs 116 (for example, the ribs 1161 and 1163) are engaged with the through holes 133P. In one embodiment, the extension direction of each of the pins 114 extending from the outside to the inside of the upper housing 112 is parallel to a first direction D1; the extension direction of the connection line between two adjacent pins 114 is parallel to a second direction D2; the extension direction of each of the conductive members 130 extending from the first extension part 131 or 131' to the second extension part 135 is at least partially parallel to a third direction D3. In the second direction D2, the ribs 116 overlap the pins 114 and the protruding parts 133. The first direction D1, the second direction D2 and the third direction D3 are perpendicular to each other. In the present embodiment, the first parts 1331 of the protruding parts 133 extend between two adjacent ribs 116 of the ribs 116 (i.e. between the ribs 1161 and 1162 and between the ribs 1163 and 1164).

Figure 5:
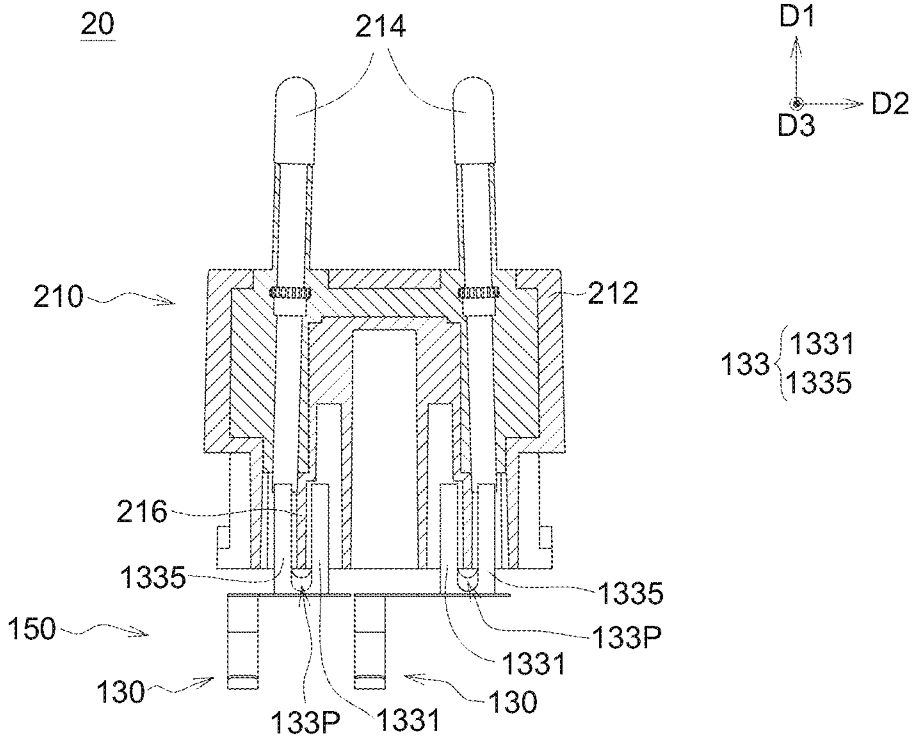
FIG. 5 is a cross-sectional view of a power supply device according to another embodiment of the present invention.

FIG. 5 shows a cross-sectional view of a power supply device 20 according to another embodiment of the present invention. One of the differences between the power supply device 20 and the power supply device 10 is that the plug 210 is different from the plug 110. The same components are marked with the same reference numerals. Other identical or similar components will not be described again.

Referring to FIG. 5, the pins 214 of the plug 210 comply with European plug specifications. If a user travels from the United States to Europe, the user only needs to remove the plug 110 of the power supply device 10 from the body 150 and replace the plug 110 with the plug 210. For example, the plug 210 is assembled to the body 150 in a sliding manner. Similarly, the plug 210 can be replaceably combined with the binding region 150R (shown in FIGS. 2A and 3A), where the plug 210 includes an upper housing 212, a plurality of pins 214 and a plurality of ribs 216. In some embodiments, the upper housing 212 and the ribs 216 are an integral structure. The pins 214 pass through the upper housing 212 from an outside of the upper housing 212 and extend to an inside of the upper housing 212 to electrically couple with the corresponding protruding parts 133. The ribs 216 are connected to the upper housing 212 and protruding toward the inside of the upper housing 212. A height of each of the ribs 216 at the inside of the upper housing 212 protruding from the upper housing 212 is greater than a height of each of the pins 214 at the inside of the upper housing 212 protruding from the upper housing 212. The height and spacing of the ribs 216 are specially designed to prevent the user's fingers FG (shown in FIG. 2C) from contacting the pins 214. The pins 214 are electrically coupled to the protruding parts 133 of the conductive members 130 respectively, and a portion of the ribs 216 extend into the through holes 133P. Since a pitch between the pins 214 is greater than a pitch between the pins 114, the pins 214 are in electrical contact with the second parts 1335 of the protruding parts 133 of the conductive members 1301 and 1302 respectively (i.e., the outer parts farther away from the center point CP). The pins 214 extend, for example, between the ribs 216 and the upper housing 212. In one embodiment, the extension direction of each of the pins 214 extending from the outside to the inside of the upper housing 212 is parallel to the first direction D1, and the extension direction of the connection line between two adjacent pins 214 is parallel to the second direction D2. The extension direction of each of the conductive members 130 extending from the first extension part 131 or 131' to the second extension part 135 is at least partially parallel to a third direction D3. In the second direction D2, the ribs 216 overlap the pins 214 and the protruding parts 133. The first direction D1, the second direction D2 and the third direction D3 are perpendicular to each other.

Figure 6:
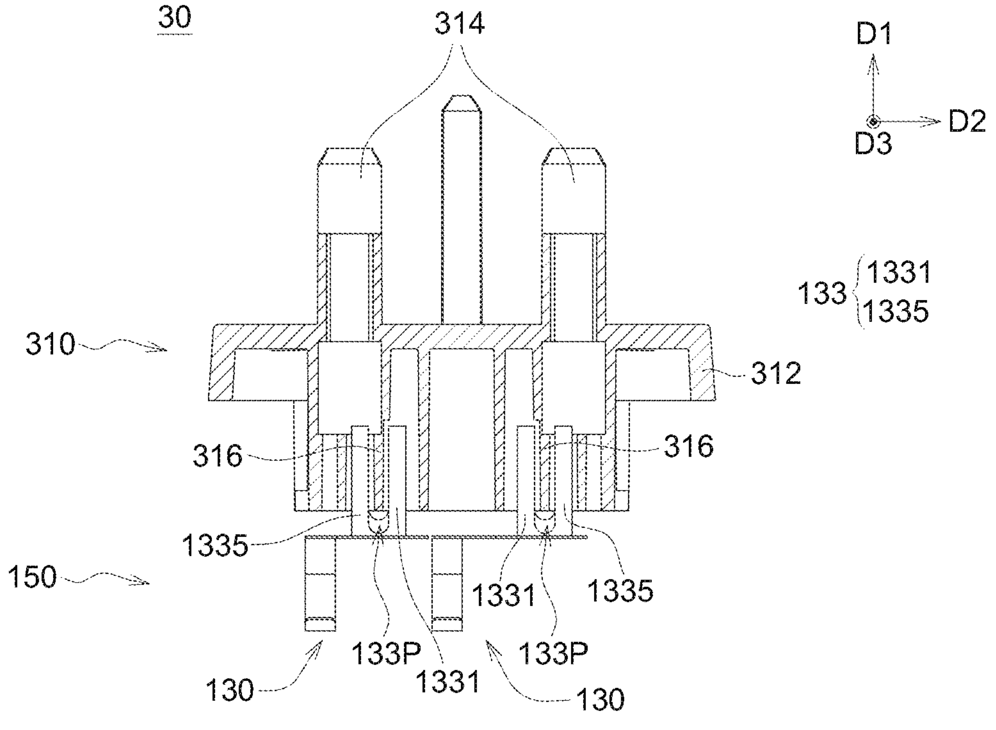
FIG. 6 is a cross-sectional view of a power supply device according to yet another embodiment of the present invention.

FIG. 6 shows a cross-sectional view of a power supply device 30 according to yet another embodiment of the present invention. One of the differences between the power supply device 30 and the power supply device 10 is that the plug 310 is different from the plug 110. The same components are marked with the same reference numerals. Other identical or similar components will not be described again.

Referring to FIG. 6, the pins 314 of the plug 310 comply with British plug specifications. If a user travels from the United States to the United Kingdom, the user only needs to remove the plug 110 of the power supply device 10 from the body 150 and replace the plug 110 with the plug 310. For example, the plug 310 is assembled to the body 150 in a sliding manner. Similarly, the plug 310 can be replaceably combined with the binding region 150R (shown in FIGS. 2A and 3A). The plug 310 includes an upper housing 312, a plurality of pins 314 and a plurality of ribs 316. In some embodiments, the upper housing 312 and the ribs 316 are an integral structure. The pins 314 pass through the upper housing 312 from the outside and extend to the inside of the upper housing 312 to electrically couple with the corresponding protruding parts 133. In the present embodiment, two pins 314 of the plug 310 (not the pins 314 used for grounding) are electrically coupled to the corresponding protruding parts 133. The ribs 316 are connected to the upper housing 312 and protruding toward the inside of the upper housing 312. A height of each of the ribs 316 at the inside of the upper housing 312 protruding from the upper housing 312 is greater than a height of each of the pins 314 at the inside of the upper housing 312 protruding from the upper housing 312. The height and spacing of the ribs 316 are specially designed to prevent the user's fingers FG (shown in FIG. 2C) from contacting the pins 314. The pins 314 are electrically coupled to the protruding parts 133 of the conductive members 130 respectively, and a portion of the ribs 316 extend into the through holes 133P. Since a pitch between the pins 314 is greater than a pitch between the pins 114, the pins 314 are in electrical contact with the second parts 1335 of the protruding parts 133 of the conductive members 1301 and 1302 respectively (i.e., the outer parts farther away from the center point CP). The pins 314 extend, for example, between the ribs 316 and the upper housing 312. In one embodiment, the extension direction of each of the pins 314 extending from the outside to the inside of the upper housing 312 is parallel to the first direction D1, and the extension direction of the connection line between two adjacent pins 314 is parallel to the second direction D2. The extension direction of each of the conductive members 130 extending from the first extension part 131 or 131' to the second extension part 135 is at least partially parallel to a third direction D3. In the second direction D2, the ribs 316 overlap the pins 314 and the protruding parts. 133. The first direction D1, the second direction D2 and the third direction D3 are perpendicular to each other.

Figure 7:
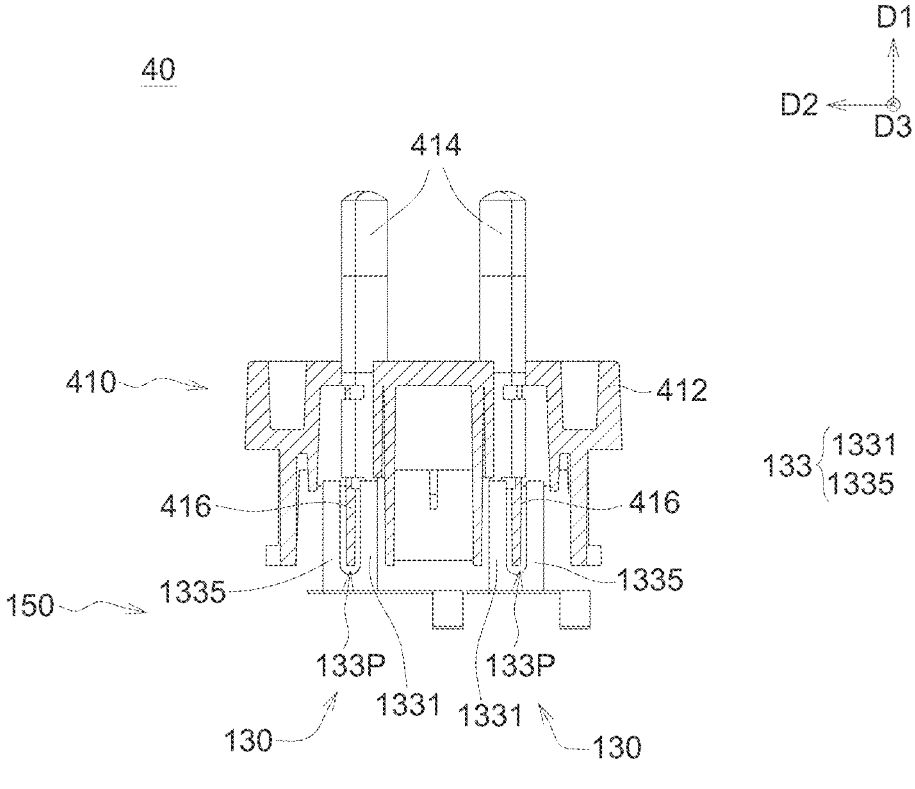
FIG. 7 is a cross-sectional view of a power supply device according to a further embodiment of the present invention.

FIG. 7 shows a cross-sectional view of a power supply device 40 according to a further embodiment of the present invention. One of the differences between the power supply device 40 and the power supply device 10 is that the plug 410 is different from the plug 110. The same components are marked with the same reference numerals. Other identical or similar components will not be described again.

Please refer to FIG. 7. The pins 414 of the plug 410 comply with Australian plug specifications. If a user travels from the United States to Australia, the user only needs to remove the plug 110 of the power supply device 10 from the body 150 and replace the plug 110 with the plug 410. For example, the plug 410 is assembled to the body 150 in a sliding manner. Similarly, a plug 410 may be replaceably combined with the binding region 150R (shown in FIGS. 2A and 3A), where the plug 410 includes an upper housing 412, a plurality of pins 414 and a plurality of ribs 416. In some embodiments, the upper housing 412 and the ribs 416 are an integral structure. The pins 414 pass through the upper housing 412 from the outside and extend to the inside of the upper housing 412 to electrically couple with the corresponding protruding parts 133. The ribs 416 are connected to the upper housing 412 and protruding toward the inside of the upper housing 412. A height of each of the ribs 416 at the inside of the upper housing 412 protruding from the upper housing 412 is greater than a height of each of the pins 414 at the inside of the upper housing 412 protruding from the upper housing 412. The height and spacing of the ribs 416 are specially designed to prevent the user's fingers FG (shown in FIG. 2C) from contacting the pins 414. The pins 414 are electrically coupled to the protruding parts 133 of the conductive members 130 respectively, and a portion of the ribs 416 extend into the through holes 133P. The pins 414 (for example, two pins 414 not used for grounding) are in electrical contact with the first parts 1331 of the protruding parts 133 of the conductive members 1301 and 1302 respectively (that is, the inner parts closer to the center point CP). The pins 414, for example, extend between two adjacent ribs 416. In one embodiment, the extension direction of each of the pins 414 extending from the outside to the inside of the upper housing 412 is parallel to the first direction D1, and the extension direction of the connection line between two adjacent pins 414 is parallel to the second direction D2. The extension direction of each of the conductive members 130 extending from the first extension part 131 or 131' to the second extension part 135 is at least partially parallel to a third direction D3. In the second direction D2, the ribs 416 overlap the pins 414 and the protruding parts 133. The first direction D1, the second direction D2 and the third direction D3 are perpendicular to each other.

The above content describes that the pins 114-414 comply with the specifications of the plugs 110-410 of one of the United States, the United Kingdom, Europe and Australia. However, the present invention is not limited thereto. In other embodiments, the pins may comply with the specifications of the plugs for, such as China and other countries.

In summary, the present invention provides a power supply device. The power supply device includes a body and a plug. The body has a binding region, wherein the body includes a plurality of conductive members assembled to the binding region separately from each other. Each of the conductive members includes a protruding part having a through hole. The plug is replaceably combined with the binding region, wherein the plug includes an upper housing, a plurality of pins and a plurality of ribs. The pins and the ribs are combined with the upper housing. The pins are electrically coupled to the protruding parts of the conductive members respectively, and a portion of the ribs are engaged with the through holes. The pins extend between two adjacent ribs or extend between a rib in the ribs and the upper housing. In some comparative examples, in order to make the plug of the power supply device suitable for different countries, the pins of the plug must be in a special-shaped design (for example, unusual materials must be selected or the pins must be specially processed), which may increase the production cost. In one embodiment of the present invention, the pins in the power supply device do not need to adopt the special-shaped design, and it is enough to use the raw materials of normal pins, and the pins are made using mature processes. Therefore, compared with the comparative example using the pins in the special-shaped design, significant cost savings can be achieved. Furthermore, the plug in the present invention is replaceable, and the body includes a conductive member with a through hole. The structural design of the conductive member can be shared with plugs (pins) of different national specifications, so the power supply device of the present invention is suitable for different countries and is quite convenient to carry. In addition, the rib design in the plug prevents the user from accidentally touching conductors (such as pins) and complies with safety regulations.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply device, comprising:

a body having a binding region, wherein the body comprises a plurality of conductive members assembled to the binding region separately from each other, wherein each of the conductive members comprises a protruding part having a through hole; and a plug replaceably combined with the binding region, wherein the plug comprises a plurality of pins and a plurality of ribs, and the pins are electrically coupled to the protruding parts of the conductive members respectively, and a portion of the ribs extend in the through holes.

2. The power supply device according to claim 1, wherein each of the conductive members comprises a first extension part and a second extension part, the protruding part is connected between the first extension part and the second extension part, and the protruding part forms a first part and a second part corresponding to an inner side and an outer side respectively by the though hole, and the inner side is closer to a center point of the binding region in comparison with the outer side.

3. The power supply device according to claim 2, wherein each of the pins is in electrical contact with the first part or the second part of the protruding part.

4. The power supply device according to claim 2, wherein the binding region comprises a recess, the protruding parts of the conductive members protrude from a bottom surface of the recess, and the first extension part and the second extension part are disposed under the bottom surface of the recess.

5. The power supply device according to claim 2, wherein the plug further comprises an upper housing, each of the pins passes through the upper housing from an outside of the upper housing and extends to an inside of the upper housing to electrically couple with a corresponding one of the protruding parts, the ribs are connected to the upper housing and protruding toward the inside of the upper housing, wherein a height of each of the ribs at the inside protruding from the upper housing is greater than a height of each of the pins at the inside protruding from the upper housing.

6. The power supply device according to claim 5, wherein an extension direction of each of the pins extending from the outside to the inside of the upper housing is parallel to a first direction, an extension direction of a connection line between two adjacent pins of the pins is parallel to a second direction, an extension direction of each of the conductive members extending from the first extension part to the second extension part is at least partially parallel to a third direction;

in the second direction, the ribs overlap the pins and the protruding parts, and the first direction, the second direction and the third direction are perpendicular to each other.

7. The power supply device according to claim 2, wherein the first part or the second part of the protruding parts is in electrical contact with a corresponding pin of the pins.

8. The power supply device according to claim 1, wherein the plug is detachably combined with the binding region in a sliding manner.

9. The power supply device according to claim 1, wherein the body further comprises a pressing part adjacent to the binding region, and the plug is detachable from the body by pressing the pressing part.

10. A power supply device, comprising:

a body having a binding region, wherein the body comprises a plurality of conductive members assembled to the binding region separately from each other, wherein each of the conductive members comprises a protruding part having a through hole; and a plug replaceably combined with the binding region, wherein the plug comprises an upper housing, a plurality of pins and a plurality of ribs; the pins and the ribs are combined with the upper housing; the pins are electrically coupled to the protruding parts of the conductive members respectively; a portion of the ribs are engaged with the through holes; the pins extend between two adjacent ribs of the ribs or extend between a rib of the ribs and the upper housing.

11. The power supply device according to claim 10, wherein each of the conductive members comprises a first extension part and a second extension part, the protruding part is connected between the first extension part and the second extension part, and the protruding part forms a first part and a second part corresponding to an inner side and an outer side respectively by the though hole, and the inner side is closer to a center point of the binding region in comparison with the outer side.

12. The power supply device according to claim 11, wherein each of the pins is in electrical contact with the first part or the second part of the protruding part.

13. The power supply device according to claim 11, wherein the binding region comprises a recess, the protruding parts of the conductive members protrude from a bottom surface of the recess, and the first extension part and the second extension part are disposed under the bottom surface of the recess.

14. The power supply device according to claim 11, wherein each of the pins passes through the upper housing from an outside of the upper housing and extends to an inside of the upper housing to electrically couple with a corresponding one of the protruding parts, the ribs are connected to the upper housing and protruding toward the inside of the upper housing, wherein a height of each of the ribs at the inside protruding from the upper housing is greater than a height of each of the pins at the inside protruding from the upper housing.

15. The power supply device according to claim 11, wherein an extension direction of each of the pins extending from an outside to an inside of the upper housing is parallel to a first direction, an extension direction of a connection line between two adjacent pins of the pins is parallel to a second direction, an extension direction of each of the conductive members extending from the first extension part to the second extension part is at least partially parallel to a third direction;

in the second direction, the ribs overlap the pins and the protruding parts, and the first direction, the second direction and the third direction are perpendicular to each other.

16. The power supply device according to claim 11, wherein the first part or the second part of the protruding parts extends between two adjacent ribs in the ribs.

17. The power supply device according to claim 10, wherein the plug is detachably combined with the binding region in a sliding manner.

18. The power supply device according to claim 10, wherein the body further comprises a pressing part adjacent to the binding region, and the plug is detachable from the body by pressing the pressing part.

* * * * *